(12) United States Patent
Allring et al.

(10) Patent No.: US 12,092,615 B2
(45) Date of Patent: Sep. 17, 2024

(54) NON-DESTRUCTIVE INSPECTION OF TEST OBJECTS ON A WORKPIECE

(71) Applicant: ABB Schweiz AG, Baden (CH)

(72) Inventors: Mattias Allring, Torslanda (SE); Carl Henriksson, Gothenburg (SE); August Ramle, Gothenburg (SE); Göran Bergström, Torslanda (SE)

(73) Assignee: ABB Schweiz AG, Baden (CH)

( * ) Notice: Subject to any disclaimer, the term of this patent is extended or adjusted under 35 U.S.C. 154(b) by 360 days.

(21) Appl. No.: 17/595,247

(22) PCT Filed: May 13, 2019

(86) PCT No.: PCT/EP2019/062142
§ 371 (c)(1),
(2) Date: Nov. 12, 2021

(87) PCT Pub. No.: WO2020/228933
PCT Pub. Date: Nov. 19, 2020

(65) Prior Publication Data
US 2022/0268740 A1    Aug. 25, 2022

(51) Int. Cl.
*G01N 29/265* (2006.01)
*B25J 9/16* (2006.01)
(Continued)

(52) U.S. Cl.
CPC .......... *G01N 29/265* (2013.01); *B25J 9/1679* (2013.01); *B25J 15/0019* (2013.01);
(Continued)

(58) Field of Classification Search
CPC .... G01N 29/265; G01N 29/04; G01N 29/043; G01N 29/0654; G01N 29/225; G01N 29/28; G01N 29/4472; G01N 2291/267
See application file for complete search history.

(56) References Cited

U.S. PATENT DOCUMENTS 9,250,213 B1    2/2016 Bossi et al.
9,594,059 B1    3/2017 Brady et al.
(Continued)

FOREIGN PATENT DOCUMENTS

CN    102507748 A    6/2012
CN    103649676 A    3/2014
(Continued)

OTHER PUBLICATIONS

International Search Report and Written Opinion of the International Searching Authority; Application No. PCT/EP2019/062142; Completed: Jan. 23, 2020; Mailing Date: Jan. 31, 2020; 10 Pages.
(Continued)

*Primary Examiner* — Benjamin R Schmitt
(74) *Attorney, Agent, or Firm* — Whitmyer IP Group LLC

(57) ABSTRACT

A method for non-destructive inspection of at least one test object on a workpiece includes the steps of: obtaining a theoretical position of each test object in relation to a testing robot; capturing an image of each test object to obtain image data; determining a real position of each test object in relation to the testing robot on the basis of the image data; and bringing a sensor carried by the testing robot in contact with each test object to obtain a respective test measurement. Where the test instrument needs to be brought in physical contact with the test object, it is crucial to know the exact position of the test object. As soon as an approximate position of the test object is known an image of the test object can be captured, and the exact position of the test object can be extracted from the respective image data.

20 Claims, 3 Drawing Sheets

(51) Int. Cl.
| | |
|---|---|
| *B25J 15/00* | (2006.01) |
| *G01N 29/04* | (2006.01) |
| *G01N 29/06* | (2006.01) |
| *G01N 29/22* | (2006.01) |
| *G01N 29/28* | (2006.01) |
| *G01N 29/44* | (2006.01) |

(52) U.S. Cl.
CPC ........... *G01N 29/04* (2013.01); *G01N 29/043* (2013.01); *G01N 29/0654* (2013.01); *G01N 29/225* (2013.01); *G01N 29/28* (2013.01); *G01N 29/4472* (2013.01); *G01N 2291/267* (2013.01)

(56) References Cited

U.S. PATENT DOCUMENTS

| | | | |
|---|---|---|---|
| 2003/0234239 A1* | 12/2003 | Lee | G01N 29/4481 219/109 |
| 2007/0144262 A1 | 6/2007 | Aznar et al. | |
| 2007/0144263 A1* | 6/2007 | Fei | G01N 29/4463 73/644 |
| 2008/0210009 A1 | 9/2008 | Tanishiki | |
| 2008/0271537 A1* | 11/2008 | Panyard | G01N 29/225 73/629 |
| 2011/0292205 A1 | 12/2011 | Yuguchi et al. | |
| 2018/0059065 A1 | 3/2018 | Hull et al. | |
| 2018/0259003 A1* | 9/2018 | Nagai | F16D 3/2233 |

FOREIGN PATENT DOCUMENTS

| | | |
|---|---|---|
| CN | 107428009 A | 12/2017 |
| CN | 109387568 A | 2/2019 |
| EP | 3354918 A1 | 8/2018 |
| WO | 2017133756 A1 | 8/2017 |

OTHER PUBLICATIONS

International Preliminary Report on Patentability; Application No. PCT/EP2019/062142; Issued: Nov. 16, 2021; 7 Pages.

Chinese Office Action; Application No. 201980096096.7; Issued: Apr. 10, 2024; 7 Pages.

European Office Action; Application No. 19725939.3; Issued: Jan. 29, 2024; 6 Pages.

* cited by examiner

NON-DESTRUCTIVE INSPECTION OF TEST OBJECTS ON A WORKPIECE

TECHNICAL FIELD

The present invention relates to non-destructive inspection of test objects such as spot welds on a car body.

BACKGROUND

It is conventionally known to manually inspect weld quality. Manual ultrasound probing is the dominant method for inspecting or testing the quality of welds within the automotive industry. Manual ultrasound inspections are expensive and time consuming. A car body may for example comprise 5000 welds. A manual cycle time for inspecting one spot weld may be 1-2 minutes. Due to the slow nature of manual work, the labour cost to find one defect weld with a manual setup can be as high as 100 kEUR. Manual ultrasound inspections are also ergonomically bad.

One solution to mitigate the effects of possible weld joint failures is to introduce a safety margin so that a higher number of spot welds are created in the joining area, i.e. a number that is higher than the number of spot welds corresponding to the calculated load-carrying capacity. Some car manufacturers use a 15-25% over specification of welds to absorb potential errors. Although there is a massive incentive to automate quality inspection of welds, none has yet been able to develop and penetrate the market with a working solution.

There remains a desire to improve the existing solutions for automated quality inspection of welds such that they work in practice and are accepted by the industry.

SUMMARY

One object of the invention is to provide an improved method for non-destructive inspection of welds and other test objects. Particularly, the object of the invention is to provide an automated method for reliably bringing a test instrument in a correct position and orientation in relation to the test objects without causing damage to the potentially fragile test instrument.

A further object of the invention is to provide an improved testing system for non-destructive inspection of welds and other test objects.

These objects are achieved by the method and the device according to the appended claims.

The invention is based on the realization that for certain type of inspection where the test instrument needs to be brought in physical contact with the test object to be inspected it is crucial to know the exact position of the test object. As soon as the approximate position of the test object is known an image of the test object can be captured, and the exact position of the test object can be extracted from the respective image data. Sometimes it's even crucial to know the physical condition of the test object, which information can also be extracted from the respective image data.

According to a first aspect of the invention, there is provided a method for non-destructive inspection of at least one test object on a workpiece, the method comprising the steps of: obtaining a theoretical position of each test object in relation to a testing robot; capturing an image of each test object to obtain image data; determining a real position of each test object in relation to the testing robot on the basis of the image data; and bringing a sensor carried by the testing robot in contact with each test object to obtain a respective test measurement.

When the real position of the test object is determined bringing the sensor in contact with the same in a correct way to obtain a valid test measurement is enabled.

According to one embodiment of the invention, the method further comprises the step of determining a position of the testing robot in relation to the workpiece.

According to one embodiment of the invention, the method further comprises the step of bringing the active direction of the sensor parallel to a symmetry axis of the respective test object before obtaining the test measurement.

According to one embodiment of the invention, the method further comprises the step of bringing the active direction of the sensor perpendicular to the theoretical surface of the workpiece at the respective test object before obtaining the test measurement.

According to one embodiment of the invention, the method further comprises the step of evaluating, on the basis of the image data, the need of smoothing out the surface of the respective test object.

According to one embodiment of the invention, the method further comprises the step of smoothing out, as a result of the evaluation, the surface of the respective test object before bringing the sensor in contact with it.

According to one embodiment of the invention, the method further comprises the step of bringing the sensor to exert the same constant force on each test object.

According to one embodiment of the invention, the sensor comprises liquid medium such as ultrasonic gel, and the method further comprises the step of bringing the liquid medium in contact with each test object.

According to a second aspect of the invention, there is provided a testing system for non-destructive inspection of at least one test object on a workpiece. The testing system comprises a testing robot carrying a sensor, a memory containing a theoretical position of each test object in relation to the testing robot, and a vision system configured to capture images of test objects and to obtain image data. The vision system is further configured to analyse the image data to determine a real position of each test object in relation to the testing robot. The testing system is configured to bring the sensor in contact with each test object to obtain a respective test measurement.

According to one embodiment of the invention, the testing system further comprises a tool for smoothing out the surface of the respective test object before bringing the sensor in contact with it.

According to one embodiment of the invention, the testing system further comprises a damper between the testing robot and the sensor, the damper being configured to detect a contact between the sensor and the workpiece, and to cause the sensor to exert the same constant force on each test object.

According to one embodiment of the invention, the sensor comprises at least one ultrasonic transducer.

According to one embodiment of the invention, the sensor comprises an array of ultrasonic transducers.

According to a third aspect of the invention, there is provided a robot system comprising a plurality of welding robots and a testing system according to any of the aforementioned embodiments.

According to one embodiment of the invention, each test object is a spot weld.

BRIEF DESCRIPTION OF THE DRAWINGS

The invention will be explained in greater detail with reference to the accompanying drawings, wherein.

DETAILED DESCRIPTION

Figure 1:
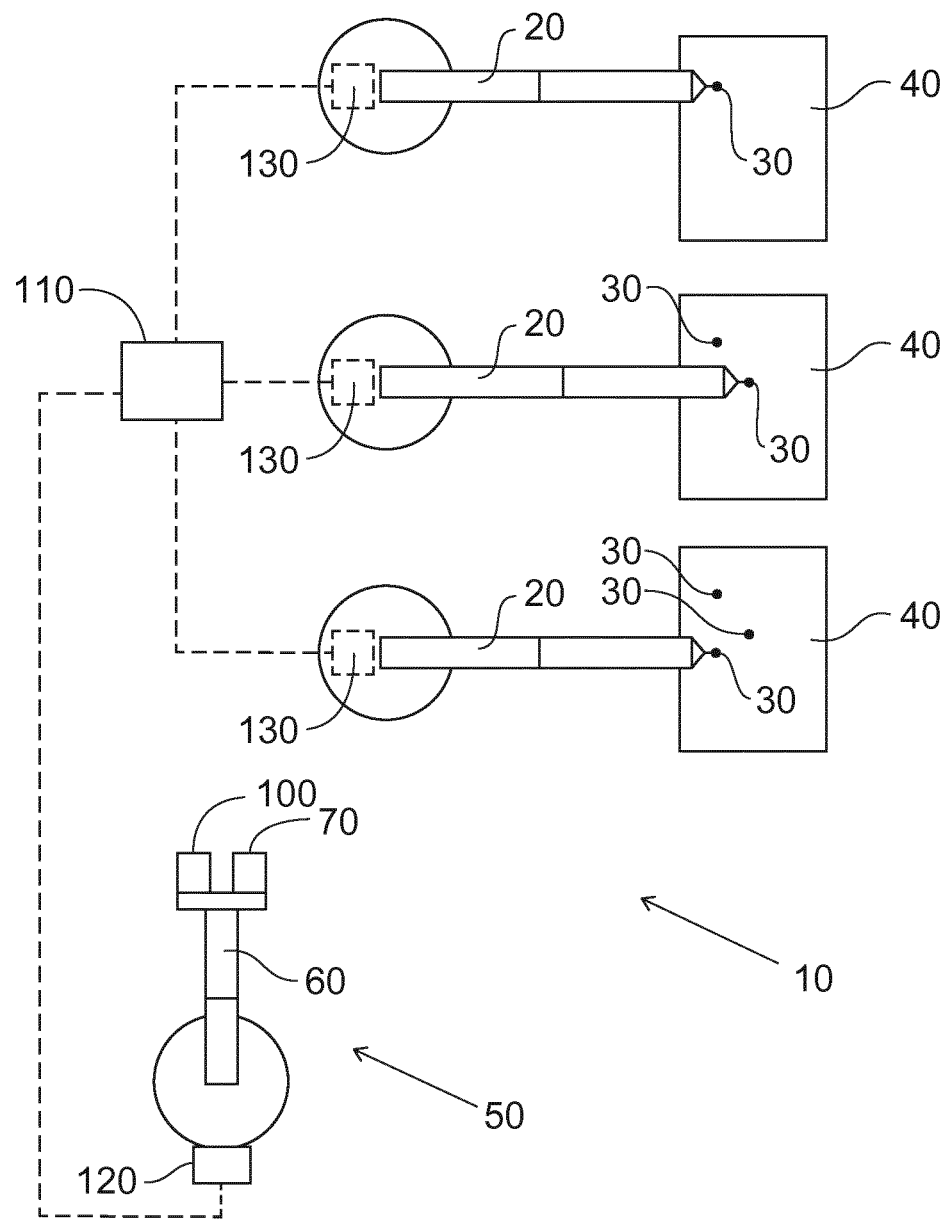
FIG. 1 shows a robot system according to one embodiment of the invention.

Referring to FIG. 1, a robot system 10 according to one embodiment of the invention comprises three welding robots 20 configured to weld spot welds 30 on workpieces, which workpieces in the present example are in the form of vehicle bodies 40. The robot system 10 further comprises a testing system 50 configured to inspect the spot welds 30 in a non-destructive manner. In the present example the spot welds 30 thereby constitute test objects for the testing system 50 to inspect.

A testing robot 60 carries a test instrument in the form of a sensor 70, such as a single ultrasonic transducer 80 or a phased array ultrasonic scanner comprising an array of ultrasonic transducers 80 (see FIG. 2), or another type of sensor 70 that is supposed to be brought in physical contact with the spot weld 30 to be inspected. When the sensor 70 comprises one or more ultrasonic transducers 80, it is typically necessary to apply ultrasonic gel 90 (see FIG. 2) or another appropriate coupling medium in physical contact with both the respective spot weld 30 and the one or more ultrasonic transducers 80 to obtain a valid test measurement. In case such coupling medium is used, it shall be considered to constitute part of the sensor 70. That is, it is enough that at least the coupling medium is in physical contact with the spot weld 30 for the sensor 70 being considered to be in physical contact with the spot weld 30.

The testing robot 60 also carries a camera 100 that is part of a vision system configured to capture images of the spot welds 30. In the context of this disclosure "capturing an image" shall be construed broadly to cover any suitable means of obtaining image data comprising information for generating an image.

To be able to capture an image on a certain spot weld 30 the testing system 50 needs to know at least an approximate position and orientation of the certain spot weld 30 in relation to the testing robot 60. To this end, according to one embodiment of the invention, a central controller 110 communicates the theoretical position of each spot weld 30 in relation to the vehicle body 40 to a testing robot controller 120, the theoretical positions being known from welding programs running in respective welding robot controllers 130 of the welding robots 20.

The testing system 50 calculates, on the basis of the theoretical positions in relation to the vehicle body 40, the theoretical position of each spot weld 30 in relation to the testing robot 60. To this end, according to the present embodiment, the vehicle body's 40 position and orientation in relation to the testing robot 60 needs to be known. This can be achieved e.g., by fastening the vehicle body 40 in a fixture (not shown) with a well-defined position and orientation in relation to the testing robot 60. Alternatively, the vehicle body's 40 position and orientation may be determined with the help of image data from the vehicle body 40 i.e., by detecting well-defined features of the vehicle body 40 to calculate a transformation between the vehicle body's 40 coordinate system and the testing robot's 60 coordinate system in a manner known to a person skilled in the art.

According to alternative embodiments of the invention, knowing the vehicle body's 40 position and orientation in relation to the testing robot 60 may not be crucial as long as approximate positions and orientations of the spot welds 30 in relation to the testing robot 60 are known. For example, the central controller 110 may communicate the theoretical positions and orientations of the spot welds 30 in relation to the fixture to the testing robot controller 120. By bringing the fixture in a well-defined position and orientation in relation to the testing robot 60 also the theoretical positions and orientations of the spot welds 30 in relation to the testing robot 60 become known to the testing robot 60 without any information on the overall position or orientation of the vehicle body 40.

The theoretical positions do not necessarily match with the real positions of the spot welds 30. There may be several reasons for this mismatch. For example, there may be an error between the position of the vehicle body 40 and the position of one or more of the welding robots 20 during the welding process, or the welding electrodes of one or more welding robots 20 may be worn out, or the individual parts of the vehicle body 40 may have inaccurate dimensions. The mismatch is typically in the order of 0-3 millimeters, which does not affect the vision system's ability to capture images of specific spot welds 30. As the approximate positions and orientations of the spot welds 30 in relation to the testing robot 60 are known, and as the testing robot 60 thereby can be moved to direct the camera 100 towards certain individual spot welds 30 or certain groups of spot welds 30, the vision system will be in the position to analyse the resulting image data to determine the real position of each spot weld 30 in relation to the testing robot 60.

As soon as the real position of each spot weld 30 in relation to the testing robot 60 is known, the testing system 50 is in the position to bring the sensor 70 in contact with each spot weld 30 to obtain a respective test measurement. However, in case the sensor 70 is very fragile, bringing it in contact with a spot weld 30 involves a risk of damaging it. For example, some phased array ultrasonic scanners comprise water or other liquid separated from the test object by a membrane sensitive for sharp shapes. As surfaces of spot welds 30 sometimes contain weld splatter which easily can damage the membrane and ultimately break it, any weld splatter should be removed before bringing such sensor 70 in contact with a spot weld 30. Even if the sensor 70 would not be sensitive for weld splatter, it may be necessary to remove the same to obtain valid test measurements since the splatter may disturb the measurement. The weld splatter may be removed by grinding and/or polishing, and the testing robot 60 may comprise an appropriate tool for smoothing out the surfaces of the spot welds 30.

However, as the process of grinding and/or polishing prolongs each inspection cycle, it should not be done unnecessarily. Therefore, according to one embodiment of the present invention the vision system is configured to analyse the image data to evaluate the need of smoothing out the surface of the respective spot weld 30. For example, the vision system may be configured to detect weld splatter which typically is clearly visible in the form of sharp edges or other sharp shapes projecting from the surfaces of spot welds 30, whereby the process of smoothing out the surface of the respective spot weld 30 may be executed only when the evaluation indicates that weld splatter is present.

Figure 2:
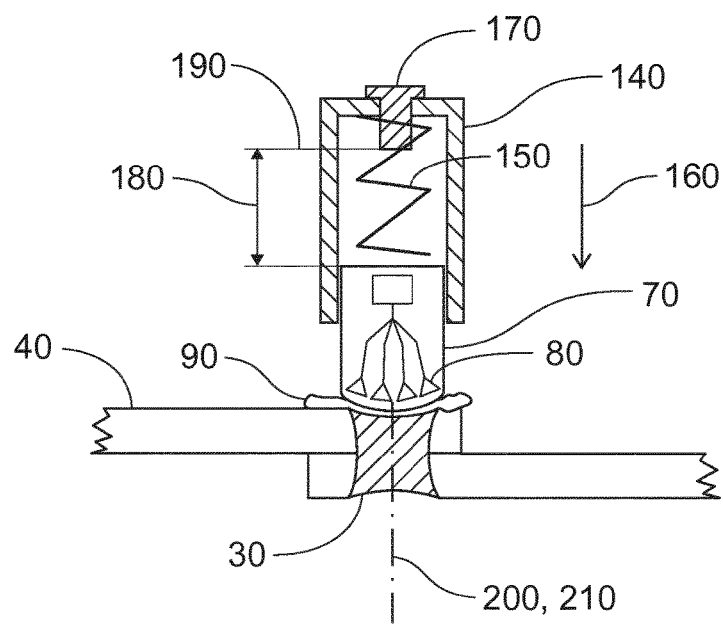
FIG. 2 shows a sensor arrangement according to one embodiment of the invention in contact with a spot weld.

It is not only sharp shapes that can damage the sensor 70. Also pushing the sensor 70 against the vehicle body 40 with an excessive force may break the sensor 70. Moreover, for the sake of obtaining valid test measurements the sensor 70 should preferably be pushed against each spot weld 30 with the same constant force. Referring to FIG. 2, according to one embodiment of the present invention the testing system 50 comprises a damper 140 between the testing robot 60 and the sensor 70. The main function of the damper 140 is to regulate the force with which the sensor 70 is pushed against the vehicle body 40 and the spot welds 30. The sensor 70 should preferably exert the same constant force on each spot weld 30 irrespective of the orientation of the sensor 70 in relation to the respective spot weld 30.

The damper 140 may comprise a spring 150 pushing the sensor 70 in a linear direction 160 in relation to the damper 140, and a distance measurement device 170 measuring a distance 180 between the sensor 70 and a reference position 190 within the damper 140. As the sensor 70 comes into contact with a spot weld 30 on a vehicle body 40, the spring 150 starts to be pushed together and the distance 180 between the sensor 70 and the reference position 190 starts to decrease, which is detected by the distance measurement device 170. The distance 180 and thereby the force exerted by the sensor 70 on the spot weld 30 can be kept constant from one test measurement to another on the basis of the reading of the distance measurement device 170. Instead of a spring 150 the damper 140 may comprise a pneumatic cylinder pushing the sensor 70 in the linear direction 160 in relation to the damper 140. The pressure within the cylinder can be controlled to compensate for gravity such that the same constant force is applied irrespective of the orientation of the sensor 70 in relation to the gravity field.

The sensor 70 in FIG. 2 is a phased array ultrasonic scanner comprising an array of ultrasonic transducers 80. It is brought into physical contact with a spot weld 30 through ultrasonic gel 90, which ultrasonic gel 90 is to be considered to constitute a part of the sensor 70. An active direction 200 of the ultrasonic scanner can be adjusted by progressively delaying pulses emitted from different ultrasonic transducers 80 in the array. In the case of a sensor 70 comprising a single ultrasonic transducer 80 the active direction 200 of the sensor 70 can be adjusted by inclining the sensor 70 itself in relation to the vehicle body 40. According to one embodiment of the invention the active direction 200 of the sensor 70 is brought parallel to a symmetry axis 210 of the respective spot weld 30 before obtaining the test measurement.

The following considerations are necessary when defining a symmetry axis 210 of a spot weld 30. Firstly, as is apparent to a person skilled in the art, a spot weld 30 is never ideally symmetrical. In order to define a symmetry axis 210, an overall idealized shape of a spot weld 30 should be considered rather than the actual shape. Secondly, the symmetry axis 210 can be based only on a part of a spot weld 30, and one and the same spot weld 30 may have several symmetry axes 210 depending on which parts of the spot weld 30 are considered. For example, a definition of a symmetry axis 210 can be based solely on visible parts of a spot weld 30. To this end the vision system can be used to capture an image of each spot weld 30 from a direction perpendicular to the theoretical surface of the vehicle body 40 at the respective spot weld 30, or from a direction perpendicular to a certain surface of the visible parts of the spot weld 30, such as the surface at a geometric centre of a visible part of a spot weld 30. Alternatively, a definition of a symmetry axis 210 can be based solely on non-visible parts of a spot weld 30.

If the shapes of a spot weld 30 are so irregular that it is not possible to define a symmetry axis 210 based on them, a symmetry axis 210 shall be considered to be a straight axis traversing a geometric centre of a visible part of a spot weld 30 in a direction perpendicular to the theoretical surface of the vehicle body 40 at the geometric centre, or in a direction perpendicular to the surface at a geometric centre of the visible part of the spot weld 30. In the context of this disclosure "theoretical surface" shall be considered as a surface disregarding the spot welds i.e., a surface of a vehicle body 40 before the spot welding takes place.

Figures 3A, 3B:
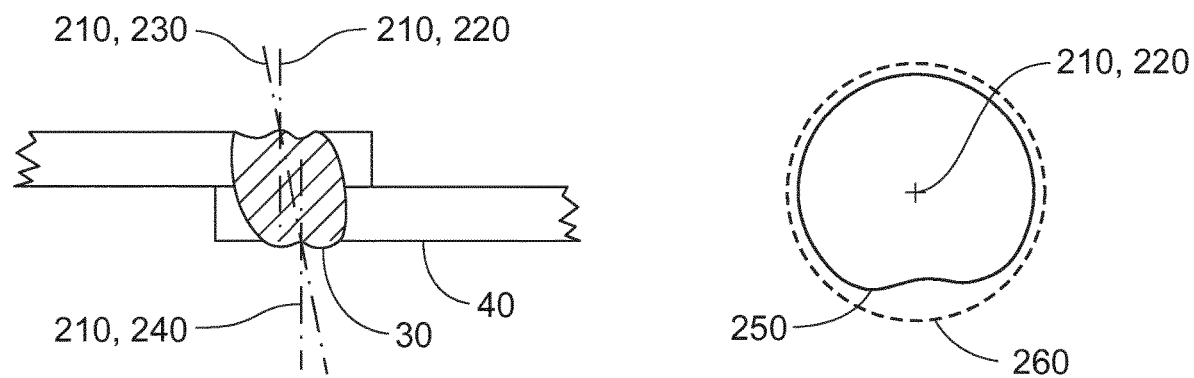
FIG. 3a shows a spot weld with three defined symmetry axes.
FIG. 3b shows an image of the spot weld in FIG. 3a, FIG. 4 shows a phased array ultrasonic scanner comprising an array of ultrasonic transducers seen from below.

Referring to FIG. 3a, a spot weld 30 may have three symmetry axes 210; a first symmetry axis 220, a second symmetry axis 230 and a third symmetry axis 240. The first symmetry axis 220 is defined based on the visible part of the spot weld 30 on the top surface of a vehicle body 40. FIG. 3b shows a spot weld image 250 from a direction perpendicular to the theoretical surface of the vehicle body 40 at the spot weld 30, and an idealized shape 260 of the same in dashed line. The first symmetry axis 220 traverses the geometric centre of the idealized shape rather than that of the actual shape. The second symmetry axis 230 is defined based on the overall shape of the spot weld 30 i.e., including the parts that are not visible. The overall shape of the spot weld 30 may be deduced from a test measurement taken in the direction of the first symmetry axis 220, after which the active direction 200 of the sensor 70 may be corrected to coincide with the second symmetry axis 230 to obtain another test measurement. The third symmetry axis 240 is defined based on the visible part of the spot weld 30 on the bottom surface of a vehicle body 40. It is however oftentimes not feasible to capture an image from two opposite sides of a spot weld 30 on a vehicle body 40.

Figure 4:
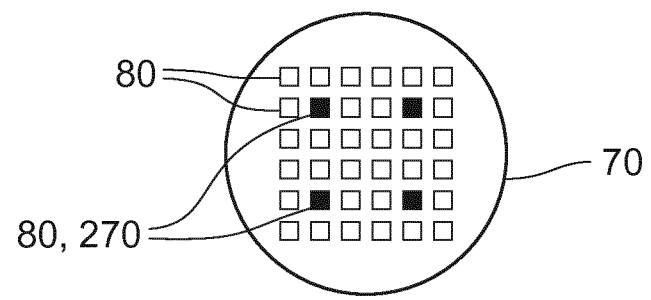

It may not be possible to deduce a three-dimensional shape of a visible part of a spot weld 30 from an image data of a 2D camera 100. To be able to define symmetry axes 210 of spot welds 30 more precisely, the vision system may contain a 3D camera 100. Alternatively, other types of sensors 70 may be utilized to obtain information of a three-dimensional shape of a spot weld 30. For example, referring to FIG. 4, phased array ultrasonic scanner may comprise an array of 6×6 ultrasonic transducers 80. All or some of these ultrasonic transducers 80, such as the four chosen ultrasonic transducers 270 shown in filled black colour in FIG. 4, can be used to measure distances to the surfaces of a vehicle body 40 (including the surfaces of spot welds 30), whereby information on three-dimensional shapes of the surfaces is obtained. Either the surface facing the sensor 70 or the surface turned away from the sensor 70 can be considered. The orientation of the sensor 70 may be at least partially based on this information e.g., by determining that the distance of each of the four chosen ultrasonic transducers 270 to the chosen surface of the vehicle body 40 needs to be substantially equal.

Figure 5:
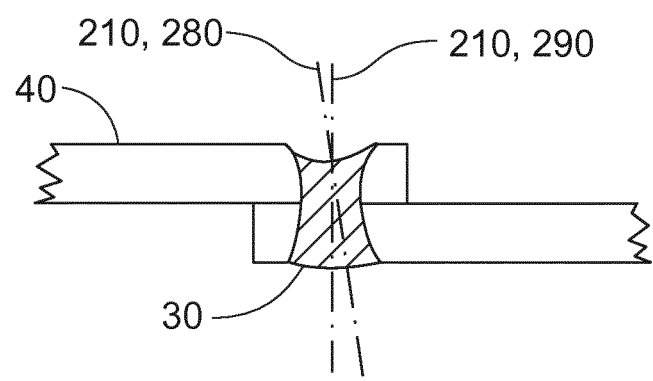
FIG. 5 shows a spot weld with two defined symmetry axes.

Referring to FIG. 5, a spot weld 30 may have two symmetry axes 210; a fourth symmetry axis 280 and a fifth symmetry axis 290. The fourth symmetry axis 280 is defined based on the visible part of the spot weld 30 on the top surface of a vehicle body 40; the fourth symmetry axis 280 traverses the geometric centre of a visible part of the spot weld 30 in a direction perpendicular to the surface of the spot weld 30 at the geometric centre. The fifth symmetry axis 290 is defined based on the overall shape of the spot weld 30 after more information on the same being obtained from a test measurement.

Instead of bringing the active direction 200 of the sensor 70 parallel to symmetry axes 210 of spot welds 30, the active direction 200 may be brought perpendicular to the theoretical surface of the vehicle body 40 at the respective spot weld 30 before obtaining the test measurement, which alternative assumes that the direction of the theoretical surface at each spot weld 30 is known. Yet alternatively, the active direction 200 may be brought parallel to a theoretical direction of the respective spot weld 30 before obtaining the test measurement, which alternative assumes that the theoretical direction of each spot weld 30 is known e.g., from the welding programs running in the respective welding robot controllers 130.

The invention is not limited to the embodiments shown above, but the person skilled in the art may modify them in a plurality of ways within the scope of the invention as defined by the claims.

The invention claimed is:

1. A method for non-destructive inspection of at least one test object on a workpiece, the method comprising the steps of:
   obtaining a theoretical position of each test object in relation to a testing robot;
   capturing an image of each test object on the basis of the respective theoretical position to obtain image data;
   determining a real position of each test object in relation to the testing robot on the basis of the image data; and
   bringing a sensor carried by the testing robot in contact with each test object on the basis of the respective real position to obtain a respective test measurement;
   wherein for each test object, the real position is determined before bringing the sensor in contact object.

2. The method according to claim 1, further comprising the step of determining a position of the testing robot in relation to the workpiece.

3. The method according to claim 2, further comprising the step of bringing the active direction of the sensor parallel to a symmetry axis of the respective test object before obtaining the test measurement.

4. The method according to claim 2, further comprising the step of bringing the active direction of the sensor perpendicular to the theoretical surface of the workpiece at the respective test object before obtaining the test measurement.

5. The method according to claim 2, further comprising the step of evaluating, on the basis of the image data, the need of smoothing out the surface of the respective test object.

6. The method according to claim 1, further comprising the step of bringing the active direction of the sensor parallel to a symmetry axis of the respective test object before obtaining the test measurement.

7. The method according to claim 1, further comprising the step of bringing the active direction of the sensor perpendicular to the theoretical surface of the workpiece at the respective test object before obtaining the test measurement.

8. The method according to claim 1, further comprising the step of evaluating, on the basis of the image data, a need of smoothing out a surface of the respective test object.

9. The method according to claim 8, further comprising the step of smoothing out, as a result of the evaluation, the surface of the respective test object before bringing the sensor in contact with it.

10. The method according to claim 1, further comprising the step of bringing the sensor to exert the same constant force on each test object.

11. The method according to claim 1, wherein the sensor comprises liquid medium, and the method further includes the step of bringing the liquid medium in contact with each test object.

12. The method according to claim 11, wherein the liquid medium is an ultrasonic gel.

13. The method according to claim 1, wherein the step of determining the real position of each test object involves extracting the real position of each test object in relation to the testing robot from the image data.

14. A testing system for non-destructive inspection of at least one test object on a workpiece, the testing system comprising:
   a testing robot carrying a sensor,
   a memory containing a theoretical position of each test object in relation to the testing robot, and
   a vision system configured to capture images of test objects on the basis of the respective theoretical position to obtain image data, the vision system further being configured to analyse the image data to determine a real position of each test object in relation to the testing robot,
   wherein the testing system is configured to bring the sensor in contact with each test object on the basis of the respective real position to obtain a respective test measurement, and
   wherein for each test object, the vision system is configured to determine the real position before the sensor is brought in contact with the test object.

15. The testing system according to claim 14, further comprising a tool for smoothing out the surface of the respective test object before bringing the sensor in contact with it.

16. The testing system according to claim 14, wherein the testing system further comprises a damper between the testing robot and the sensor, the damper being configured to detect a contact between the sensor and the workpiece, and to cause the sensor to exert the same constant force on each test object.

17. The testing system according to claim 14, wherein the sensor comprises at least one ultrasonic transducer.

18. The testing system according to claim 17, wherein the sensor comprises an array of ultrasonic transducers.

19. A robot system comprising:
   a plurality of welding robots; and
   a testing system for non-destructive inspection of at least one test object on a workpiece, the testing system comprising:
      a testing robot carrying a sensor,
      a memory containing a theoretical position of each test object in relation to the testing robot, and
      a vision system configured to capture images of test objects on the basis of the respective theoretical position to obtain image data, the vision system further being configured to analyse the image data to determine a real position of each test object in relation to the testing robot,
      wherein the testing system is configured to bring the sensor in contact with each test object on the basis of the respective real position to obtain a respective test measurement, and
      wherein for each test object, the vision system is configured to determine the real position before the sensor is brought in contact with the test object.

20. A method for non-destructive inspection of at least one lest object on a workpiece, the method comprising the steps of:

obtaining a theoretical position of each test object in relation to a testing robot;
capturing an image of each test object on the basis of the respective theoretical position to obtain image data;
determining a real position of each test object in relation to the testing robot on the basis of the image data; and
bringing a sensor carried by the testing robot in contact with each test object on the basis of the respective real position to obtain a respective test measurement;
wherein for each test object, the real position is determined before bringing the sensor in contact with the test object;
wherein each test object is a spot weld.

\* \* \* \* \*